US006543683B2

(12) United States Patent
Hoffman

(10) Patent No.: US 6,543,683 B2
(45) Date of Patent: Apr. 8, 2003

(54) SYSTEM AND METHOD FOR PROVIDING CONSUMER ACCESS TO A STORED DIGITAL RECEIPT GENERATED AS A RESULT OF A PURCHASE TRANSACTION AND TO BUSINESS/CONSUMER APPLICATIONS RELATED TO THE STORED DIGITAL RECEIPT

(75) Inventor: Mark S. Hoffman, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 63 days.

(21) Appl. No.: 09/781,815

(22) Filed: Feb. 12, 2001

(65) Prior Publication Data

US 2002/0109007 A1 Aug. 15, 2002

(51) Int. Cl.[7] .............................................. G06F 17/00
(52) U.S. Cl. .......................... 235/375; 235/383; 705/24; 705/16
(58) Field of Search .................................. 235/383, 385, 235/375; 186/61; 705/16, 21, 24, 26, 14, 39, 40, 42

(56) References Cited

U.S. PATENT DOCUMENTS

| 5,739,512 | A |   | 4/1998  | Tognazzini |
|-----------|---|---|---------|------------|
| 5,903,880 | A |   | 5/1999  | Biffar |
| 5,915,022 | A |   | 6/1999  | Robinson et al. |
| 5,969,324 | A | * | 10/1999 | Reber et al. ................. 235/383 |
| 5,978,772 | A | * | 11/1999 | Mold ........................... 186/61 |
| 6,047,269 | A |   | 4/2000  | Biffar |
| 6,341,353 | B1 | * | 1/2002  | Herman et al. ............. 713/201 |
| 6,487,540 | B1 | * | 11/2002 | Smith et al. ................... 705/21 |

* cited by examiner

Primary Examiner—Karl D. Frech
Assistant Examiner—Jamara A. Franklin
(74) Attorney, Agent, or Firm—Maginot, Moore & Bowman LLP

(57) ABSTRACT

A system, method and apparatus provides a consumer means to access a digital receipt generated as a result of a purchase transaction and stored in a storage device. Additionally, the consumer is provided the means to access various applications, features, and/or functions related to the stored digital receipt. An address of the stored digital receipt is provided to the consumer in machine-readable form, preferably on a paper receipt for the purchase transaction that corresponds to the digital receipt for the particular purchase transaction. The address in machine-readable form allows the consumer to access the stored digital receipt by a machine operable to read the machine-readable form and connectable to the storage device. The address also allows the consumer to access applications, programs, features, and/or functions related to the stored digital receipt. Such applications include, without being exhaustive, verification for purchases, verification for credits (return of merchandise), and frequent shopper points.

15 Claims, 6 Drawing Sheets

SYSTEM AND METHOD FOR PROVIDING CONSUMER ACCESS TO A STORED DIGITAL RECEIPT GENERATED AS A RESULT OF A PURCHASE TRANSACTION AND TO BUSINESS/CONSUMER APPLICATIONS RELATED TO THE STORED DIGITAL RECEIPT

FIELD OF THE INVENTION

The present invention relates generally to digital receipts generated as a result of a purchase transaction and, more particularly, to the storage thereof and access to a digital receipt generated as a result of a purchase transaction.

DESCRIPTION OF THE PRIOR ART

In the business world of today and especially the retail business world, purchase transactions are typically concluded on electronic cash registers or other various types of computer controlled retail terminals in general. Retail terminals allow the business to easily perform the purchase transaction including obtaining various information regarding the purchase transaction and providing a receipt for the purchase transaction. The collected data regarding the purchase transaction is typically stored in a database for use by the business. Such use may be for marketing purposes.

As evidence of the purchase transaction, a receipt is generated and given to the consumer (buyer). Because the purchase transaction is typically entered into a computer controlled device to calculate sale data, compute sales tax, and perform various other functions, it is known to provide an electronic or digital receipt for the purchase of such goods and/or services in addition to or in lieu of a paper receipt. The digital receipt is essentially a compilation of purchase transaction data. The digital receipt is generated and stored by the business and then delivered via electronic mail (e.g. by e-mail via an electronic network) to the customer/purchaser. Electronic mail, using either a public or open network such as the Internet, or a proprietary network, is a simple means of communicating digital information (i.e. the digital receipt) from one location to another location. Digital receipts are easily stored and retrieved by the business. Thus, the digital receipt provides a means for retailers, merchandise suppliers, distributors and Internet retailers to provide purchase transaction and other information to the consumer in an easily storable and retrievable form.

However, while the business may easily retrieve a stored digital receipt and/or the purchase transaction data contained therein, the consumer typically only receives an electronic copy of the digital receipt. The consumer cannot access the stored digital receipt, nor can the consumer access other functionality associated with the purchase transaction and/or digital receipt as offered by the business.

What is therefore needed is a system and/or method that is operable to provide a consumer access to a digital receipt generated as a result of a purchase transaction between the consumer and a business and stored by the business.

What is therefore further needed is a system and/or method that is operable to allow a consumer access to business/consumer features and/or functionality related to a stored digital receipt generated as a result of a purchase transaction between the consumer and the business.

What is therefore further needed is a system and/or method that is operable to provide a consumer the means to access a stored digital receipt pertaining to a purchase transaction between the consumer and a business, and/or business/consumer features and/or functionality related to the stored digital receipt.

SUMMARY OF THE INVENTION

The present invention is a system, method and apparatus for providing a consumer means to access a digital receipt generated as a result of a purchase transaction and stored in a storage device. Additionally, the present invention provides the consumer the means to access various applications, features, and/or functions related to the stored digital receipt.

In particular, the present invention is a system, method, and apparatus for providing an address to a consumer that allows access to a digital receipt generated as a result of a purchase transaction between the consumer and a business and stored in a storage device. The address also allows the consumer access to applications, programs, features, and/or functions related to the stored digital receipt (collectively "applications"). Such applications include, without being exhaustive, verification for purchases, verification for credits (return of merchandise), and frequent shopper points.

In one form, the present invention is a retail terminal having a processing unit, a printer in communication with the processing unit, and memory in communication with the processing unit. The memory contains a plurality of program instructions which, when executed by the processing unit, causes the processing unit to: (i) generate a digital receipt corresponding to a purchase transaction; (ii) obtain an address of a storage location for the digital receipt; and (iii) cause the printer to print the address of the storage location for the digital receipt.

In another form, the present invention is a system for allowing a party to a purchase transaction access to a stored digital receipt and/or applications relating to the purchase transaction. The system includes a retail terminal in communication with an electronic network, a printer associated with the retail terminal and operable to print a network address in a machine readable form, and an addressable storage medium in communication with the electronic network. The retail terminal is operable to: (i) produce a digital receipt corresponding to a purchase transaction; (ii) obtain a network address corresponding to a storage location of the digital receipt in the addressable storage medium; (iii) store the digital receipt at the network address in the addressable storage medium; (iv) provide the network address to the printer; and (v) cause the printer to print the network address in the machine-readable form.

In still another form, the present invention is a method of providing consumer access to a stored digital receipt corresponding to a purchase transaction between the consumer and a purchase transaction entity. The method includes the steps of: generating a digital receipt in connection with a purchase transaction; obtaining an address of a storage location in an addressable storage medium for the digital receipt; storing the digital receipt in the addressable storage medium at the storage location address; and printing the storage location address during the purchase transaction in a machine-readable form. The storage location address is in machine-readable form to provide the consumer access to the digital receipt and/or an application related to the digital receipt upon the storage location address being read by a machine operable to read such machine-readable form and be in communication with the storage medium.

The present invention thus makes the stored digital receipt available for viewing and/or retrieval by the consumer and as a gateway to a variety of features offered by the business.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views.

DETAILED DESCRIPTION

While the invention is susceptible to various modifications and alternative forms, the specific embodiment(s) shown and/or described herein is by way of example. It should thus be appreciated that there is no intent to limit the invention to the particular form disclosed, as the intention is to cover all modifications, equivalents, and alternatives falling within the spirit and scope of the invention as defined by the appended claims.

Figure 1:
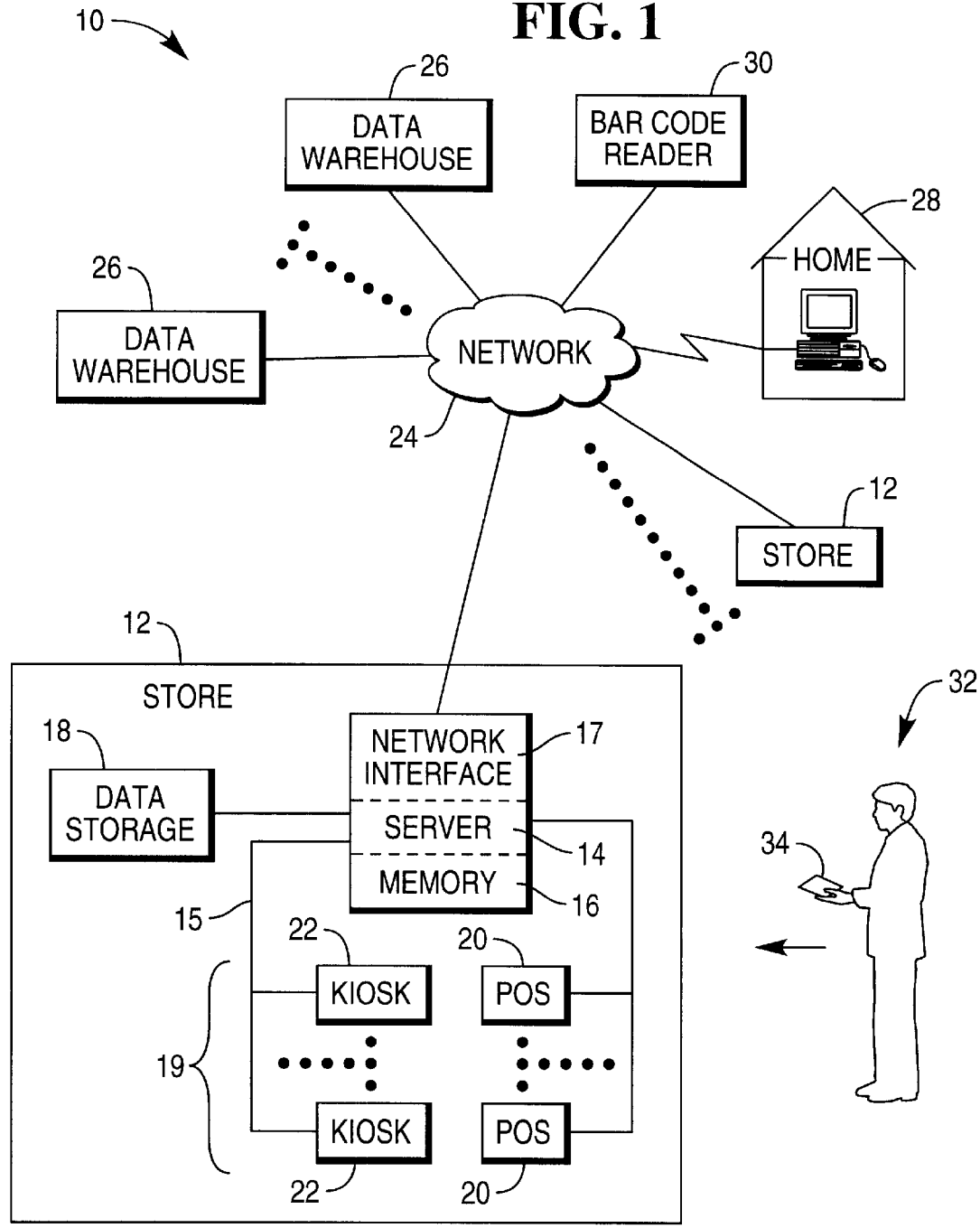
FIG. 1 is a simplified diagram of a representative system for implementing the principles of the present invention.

Referring now to FIG. 1, there is depicted a diagram of an overall system, collectively generally designated 10, whose components and/or the whole of which is operable to implement the various aspects and/or principles of the present invention. It should initially be understood that the system 10 as depicted in FIG. 1 is representative or exemplary of any system operable to implement the principles of the present invention. The system 10 is not intended to be an exact representation of any particular system nor is it intended to imply that only this type of system may implement the various aspects and/or principles of the present invention. The system 10 as shown in FIG. 1 provides a basic model for understanding the various aspects and/or principles of the present invention, the various forms through which the various aspects and/or principles of the present invention may be manifested, and the many ways in which the various aspects and/or principles of the present invention may be carried out.

The system 10 includes various subsystems or components that are operable to carry out the principles of the present invention. More particularly, in accordance with an aspect of the present invention, the system 10 is operable, without being limited, to consummate a purchase transaction including obtaining item, consumer, and other information or data, accept payment for the purchase transaction, generate receipts (printed/paper and digital) for the purchase transaction, store purchase transaction data including assigning a data storage address or receiving a data storage address for the digital receipt, and generate and/or provide data back to the consumer. Further, in accordance with an aspect of the present invention, the system 10 is operable to allow a consumer access to the storage location (address) of the digital receipt (preferably designated by a Uniform Resource Locator or URL) generated as a result of the purchase transaction. Additionally, in accordance with another aspect of the present invention, the consumer is allowed access to various programs, features, and/or functionality relating to the stored digital receipt via the address of the stored digital receipt.

Initially, it should be understood that a purchase transaction transpires whenever a person or entity transfers money (payment) for goods or services. The purchase transaction can be characterized by a plurality of purchase transaction datum (i.e. purchase transaction data). The purchase transaction data is composed of fundamental pieces of datum regarding the purchase transaction such as what was purchased, where it was purchased, who purchased it, how much it cost, how many were purchased, in what manner was payment tendered, when did the transaction take place, etc. This type of data is obtained and/or generated during a purchase transaction by a variety of purchase transaction devices from a simple cash register to automatic electronic transaction terminals. As well, these devices are operable to carry out the present invention. In particular, these devices and/or sub-systems are operable to accept payment for the goods and/or services.

A purchase transaction typically is initiated in a store 12 of which several stores collectively labeled 12 are shown. Each store 12 is in communication with an electronic network 24 such as the Internet. It should be appreciated, however, that the purchase transaction may be accomplished via an electronic network (e.g. the Internet), telephone, or other "non-physical" interaction. The present discussion is applicable to all purchase transaction situations. Further, while not shown for each store 12, each store will typically have the various components described below. Thus, the discussion regarding one store is applicable to all of the stores 12 shown in FIG. 1, even though in FIG. 1 a particular store may not be shown to have every component mentioned herein, or may not have every component mentioned herein. As well, a particular store may have additional components not shown and/or described herein.

The store 12 includes a server 14, in-store processor or main computer such as is known in the art. The server 14 includes a typical processing unit (not shown), various components such as are known in the art (e.g. a display/monitor, a data storage, a data entry device, etc.) but not shown, and memory 16. The memory 16 is operable to store program instructions (i.e. software), at least temporarily, therein for execution by the server 14 and other components. The server 14 is in communication with a data storage device 18, such as a hard disk, that is operable to store data and/or program instructions (e.g. software) for use and/or execution by the server 14. The server 14 may store program instructions for overall operation and/or use by the store and/or for use by the various retail terminals 19. This may be in addition to program instructions stored in and used by a retail terminal.

The server 14 also includes a network interface 17 that allows the server 14 to be in bi-directional communication with a public or private electronic network 24. In the preferred form, the electronic network 24 is the Internet (i.e.

a public network). However, it should be appreciated that any type of electronic network or the like may be used. The server 14 may be coupled to/in communication with the network 24 in a variety of manners such as are known in the art.

The server 14 is typically in bi-directional communication with a plurality of retail terminals, generally designated 19. In particular, the server 14 is in bi-directional communication with a plurality of point-of-service (POS) terminals 20 and/or a plurality of kiosks 22. It should be appreciated, however, that the server 14 may be in bi-directional communication with a plurality of only POS terminals 20 or kiosks 22, a single POS terminal 20 or kiosk 22, or any combination thereof. Typically, the store 12 has a number of retail terminals 19 of various kinds. Each retail terminal 19 is operable to transact a purchase transaction with the consumer and/or function in accordance with the principles of the present invention. In this regard, a consumer 32 receives a paper receipt 34 from the particular retail terminal of the store 12.

The server 14 is in communication with a variety of components/devices that are likewise in communication with the network 24. Without being exhaustive, such components/devices includes other stores 12, a data warehouse 26, a plurality of data warehouses 26, a bar code reader 30 situated anywhere, and a home computer 28. The home computer 28 is a typical computer as is known in the art that is operable to connect to the network 24. While not specifically shown, the home computer 28 may include various peripherals and/or functionality in like manner to a retail terminal 19.

In accordance with an aspect of the present invention, the server 14 (or store 12) is operable to connect to or be in communication with any one or all of the data warehouses 26 that are in communication with the network 24 in order to send/transmit a digital receipt generated by any one of the retail terminals 19 during or after a purchase transaction for storage therein. The server 14 is also operable to either assign an address (such as a Uniform Resource Locator (URL) or the like) corresponding to a particular storage location in the data warehouse 26 for the digital receipt, in which case the digital receipt is stored in the assigned location of the data warehouse 26, or an address for storage of the generated digital receipt in the data warehouse 26 is obtained during or after storage of the digital receipt therein.

It should be appreciated that, while not shown, each retail terminal 19 may be in direct connection with the network 24 wherein the functionality and/or components associated with the server 14 as described herein, would be applicable to each particular retail terminal 19. This may be the case where a store has only one retail terminal 19. Such may also be the case for a stand-alone retail terminal (e.g. ATM, kiosk or the like) not in and/or associated with a particular store.

In accordance with the principles of the present invention, the retail terminal 19 generates a paper receipt 34 (shown as held by the consumer 32 in FIG. 1) for a purchase transaction between the consumer 32 and the store 12. The retail terminal 19 also generates a corresponding digital receipt for the purchase transaction. The paper receipt 34 is given to and retained by the consumer 32 while the digital receipt is forwarded to a storage location such as a data warehouse 26 or onsite data storage device 18. In accordance with an aspect of the present invention, regardless of the storage device and/or location thereof, the digital receipt is assigned a storage address that is accessible via the network 24 by a network enabled apparatus that is connectable to the network 24. Additionally, the address for the stored digital receipt is encoded and/or printed onto the paper receipt 34, preferably in a scannable or machine-readable format. The encoded address may be printed onto any medium other than the paper receipt 34 if desirable. The address may also be encoded onto a magnetic strip such as is readable by a card reader.

Figure 2:
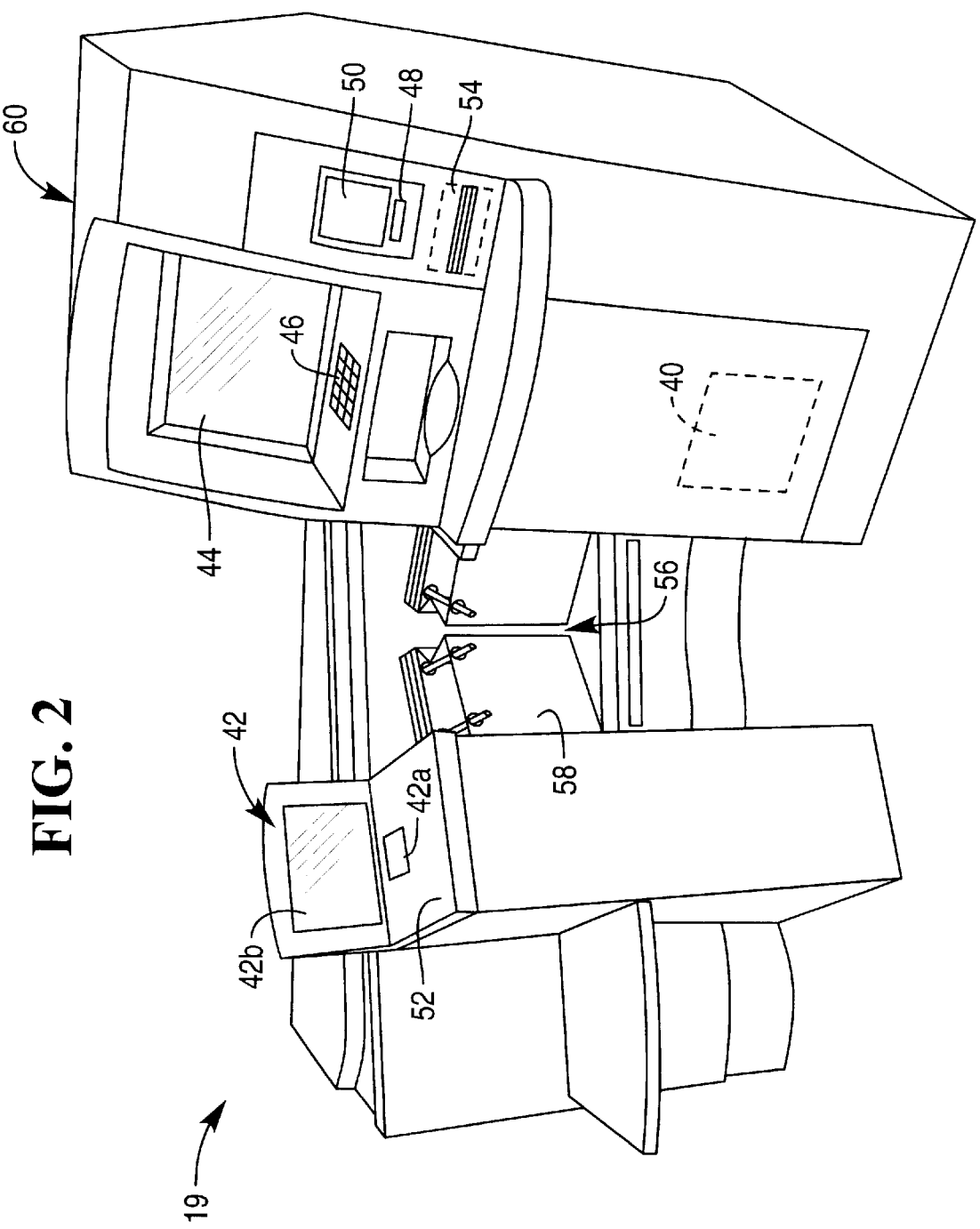
FIG. 2 is a representative retail terminal that may be utilized per the principles of the present invention.

Referring now to FIG. 2, there is shown a retail terminal 19 and, more particularly, a point-of-service (POS) or self-service checkout terminal. It should be appreciated that the retail terminal 19 of FIG. 2 is exemplary of any type of retail terminal (i.e. POS 20, kiosk 22, or the like) that may be utilized by the store 12 in accordance with the principles presented herein. The retail terminal 19 shown in FIG. 2 is preferably for use in a retail business such as a grocery store.

The retail terminal 19 includes a processing unit 40, a scanner 42, a display monitor 44, a data input device 46, a card reader 48, a currency acceptor 50, a product scale 52, and a printer 54. The retail terminal 19 also includes a bag well 56 for accommodating one or more grocery bags 58. The display monitor 44, the data input device 46, the card reader 48, the currency acceptor 50, the printer 54, and other electronic components may be embodied as separate devices located on or around the retail terminal 19, or may be preferably embodied as integral components, such as associated with an automated teller machine (ATM), kiosk, or the like 60.

The scanner 42 conventionally scans or reads a product identification code such as a Universal Product Code (UPC), industrial symbol(s), bar code(s), alphanumeric character(s), and/or other indicia associated with an item to be purchased, a paper receipt, and/or any other type of scannable item. In addition and in accordance with an aspect of the present invention, the scanner 42 is operable to scan or read a bar code such as the 128 bar code standard or other machine-readable indicia that preferably includes the (encoded) address of the storage location of a digital receipt. One scanner that may be used in the present invention is a model 7875 bi-optic scanner that is commercially available from NCR Corporation of Dayton, Ohio, USA. While not shown, the scanner 42 may be part of the ATM (kiosk) 60 when the kiosk 60 is a stand-alone retail terminal. This may be the case when the kiosk is used for purposes other than a grocery store checkout.

The scanner 42 includes a first scanning window 42a and a second scanning window 42b. The first scanning window 42a is disposed in a substantially horizontal manner, whereas the second scanning window 42b is disposed in a substantially vertical manner, as is depicted in FIG. 2. The product scale 52 is integrated with the scanner 42. More specifically, the product scale 52 is positioned substantially parallel to the scanning window 42a thereby enveloping the scanning window 42a. If an item such as produce is placed upon the product scale 52 or the first scanning window 42a, the product scale 52 may be used to determine the weight of the item.

The scanner 42 also includes a light source (not shown) such as a laser, a rotating mirror (not shown) driven by a motor (not shown), a mirror array (not shown), and appropriate circuitry/logic. In operation, a laser beam reflects off the rotating mirror and mirror array to produce a pattern of scanning light beams. As the product identification code on an item, an encoded digital receipt address (such as a URL encoded as a 128 standard bar code) from a paper receipt or the like, or any scannable indicia on an item, paper, receipt, card, or the like, is passed over the scanner 42, the scanning light beams scatter off the code and are returned to the scanner 42 where they are collected and detected. The reflected light is then analyzed electronically in order to determine whether the reflected light contains a valid code pattern, code or indicia. If a valid code pattern, code or indicia is present, it is then converted accordingly. In the case of a UPC, various look-up tables/databases are electronically consulted by the system to obtain pricing data. In the case of an encoded address for or any indicia that includes an address for a stored digital receipt, the system connects to the particular address (i.e. storage location) encoded therein for a previously generated and stored digital receipt. Once the system has connected to the address for the previously stored digital receipt, the consumer may browse the contents of the digital receipt on the display monitor 44. The consumer may also access various applications that correspond to the digital receipt. Such applications may be stored at the data warehouse 26 or be accessible through the data warehouse via the retail terminal 19.

It should be appreciated that the various components may be situated in locations and/or positions other than those shown. As well, the retail terminal 19 may have components other than those shown. Additionally, while a single retail terminal is shown in FIG. 2, it should be appreciated that the same retail terminal typically is not utilized to obtain a printed storage address for the digital receipt generated as a result of the purchase transaction and utilized to read a previously printed storage address in order to access the stored digital receipt and/or applications related or corresponding to the stored digital receipt. However, since a substantially identical retail terminal is utilized for both functions, only a single retail terminal is described in detail herein. It should as well be appreciated that the ability to access the stored digital receipt and/or the various applications pertaining thereto is not limited to a "retail terminal" per se. Since the digital receipt and its related applications are accessible via the network 24, any device that is capable of reading the printed address or accepting a keyed in address for the stored digital receipt, and which is connectable to the network 24 may be used.

Figure 3:
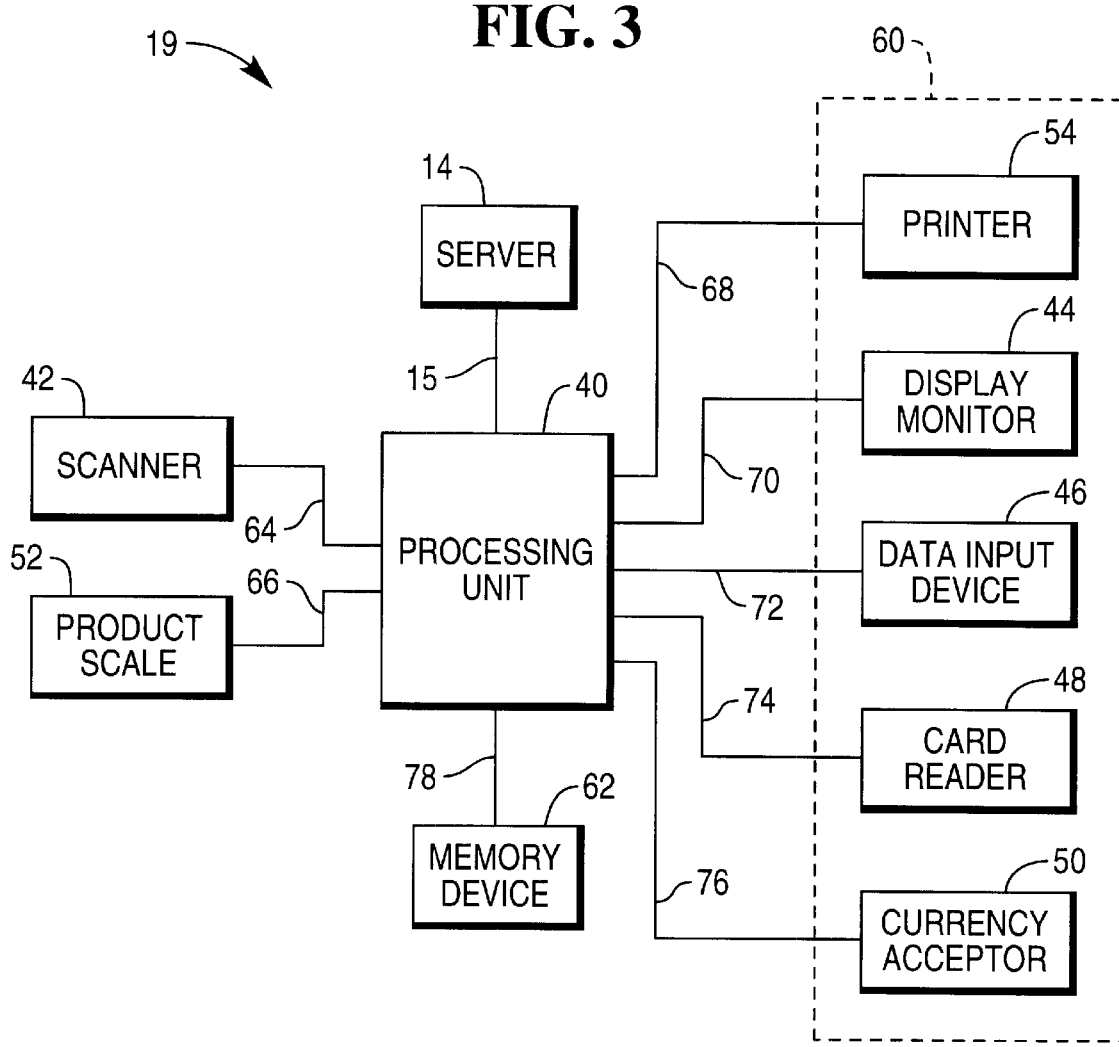
FIG. 3 is a block diagram of the retail terminal of FIG. 2.

Referring now to FIG. 3, there is shown a simplified block diagram of the retail terminal 19. The processing unit 40 is electronically coupled to the scanner 42 via a communication line 64, a memory device 62 via a communication line 78, the display monitor 44 via a communication line 70, the data input device 46 via a communication line 72, the card reader 48 via a communication line 74, the product scale 52 via a communication line 66, the currency acceptor 50 via a communication line 76, and the printer 54 via a communication line 68. Moreover, the processing unit 12 is electronically in communication with the network 24 via the server 14 via a communication line 15. Alternatively, the processing unit 40 may be in electronic communication with the network 24 directly.

The processing unit 12 monitors output signals generated by the scanner 42 via the data communication line 64. In particular, the scanner 42 generates an output signal on the data communication line 64 when an encoded address for a previously stored digital receipt via a bar code or other indicia associated with the paper receipt 34, other type of paper (not shown), or the like, is successfully scanned or otherwise read by the scanner 14. In particular, and in accordance with an aspect of the present invention, when an address in a machine-readable or scannable form is presented to and read by the scanner 42, the processing unit 40 then connects to the address. As well, when an address is keyed into or provided to the processing unit 40, a connection is also made to the address. This is preferably a storage location address (address) within the addressable data warehouse 26. In particular, the address is preferably a URL for the storage location within the data warehouse 26, with the data warehouse 26 in communication with the electronic network (e.g. the Internet). The memory device 62 contains program instructions that allow the retail terminal 19 to function in accordance with the principles presented herein in conjunction with program instructions maintained on the server 14 or by the retail terminal 19 itself.

Figure 5:
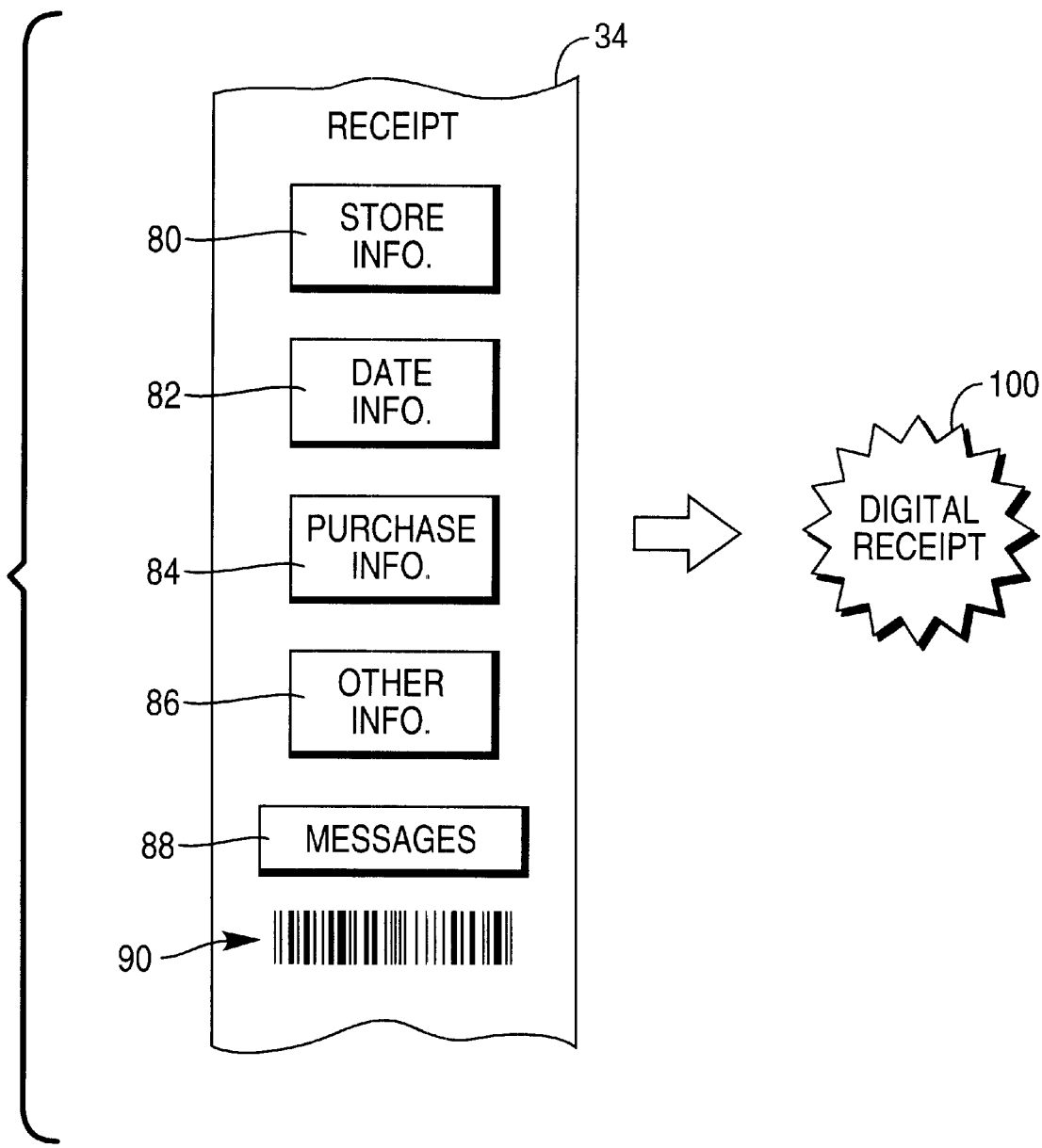
FIG. 5 is a representation of receipts generated by the present invention.

When the retail terminal 19 is in a purchase transaction mode (i.e. a consumer is using the retail terminal 19 to make a purchase) the printer 54 is operable to provide the paper receipt 34 for the purchase transaction. Referring to FIG. 5, an exemplary paper receipt 34 is shown. The paper receipt 34 includes store or business information 80, date information 82, purchase information 84, other information 86, and messages 88. In accordance with an aspect of the present invention, the paper receipt 34 also has a bar code 90 (or other machine-readable indicia) or accepts a "keyed in" address that encodes or is a storage location address (address) for the digital receipt 100 generated during the purchase transaction and stored in an addressable storage medium, such as the data warehouse 26, at the particular location address printed onto the paper receipt 34. The address 90 may be printed for the consumer on a medium other than paper and/or a receipt, but nonetheless, is provided to the consumer during or after the purchase transaction.

The digital receipt 100 is stored in the data warehouse 26 (addressable storage medium) that is in communication with the network 24 (see FIG. 1). The particular address of the storage location in the data warehouse 26 may be obtained from the data warehouse 26 during or after the purchase transaction. Alternatively, the retail terminal 19 may obtain the address by generating the address from known addresses in the data warehouse 26 then send both the digital receipt and the chosen address to the data warehouse 26 for storage of the digital receipt.

Figure 4:
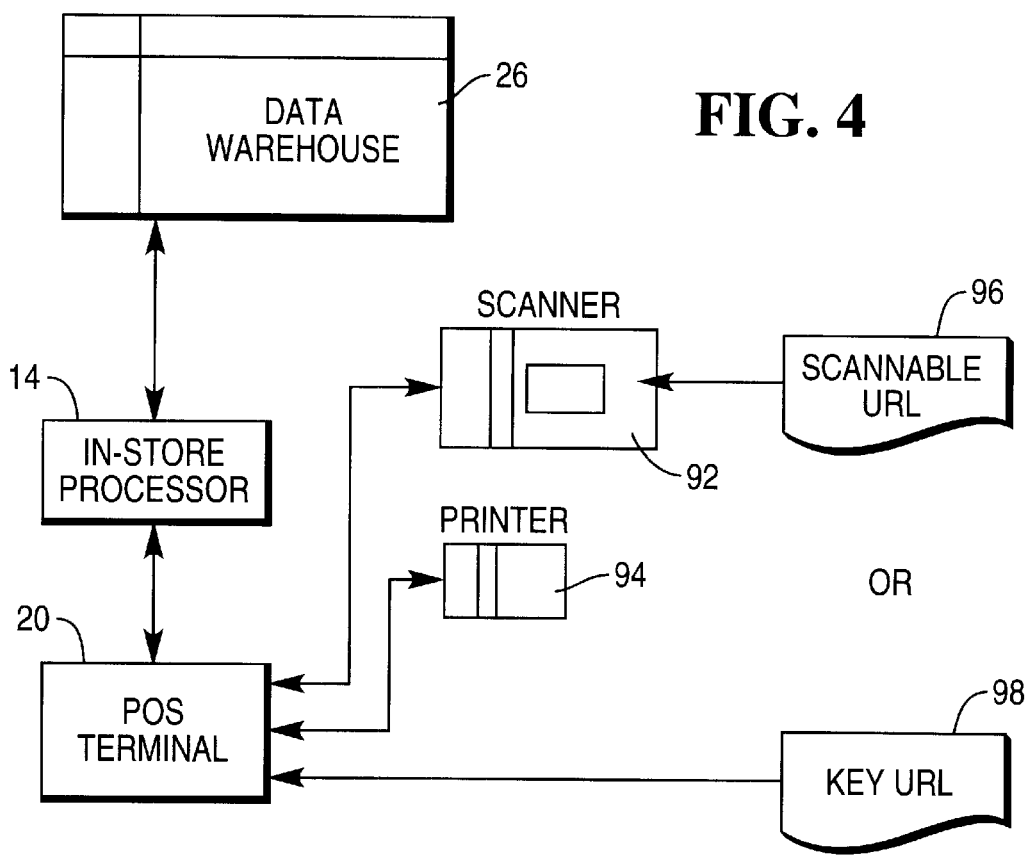
FIG. 4 is a simplified block diagram of a portion of the system of FIG. 1 illustrating a manner in which the principles of the present invention may be employed.

Referring to FIG. 4, when a POS terminal 20, representing any system operable to receive an address in accordance with the principles presented herein (such as a home computer, a retail terminal, or the like) is in a scanning mode, a scannable URL (address) 96 presented to its scanner 92 causes the POS terminal 20 to access the data warehouse 26 via the in-store processor 14 (or to access the data warehouse 26 via an ISP or the like in the case of a home computer, or to access the data warehouse 26 directly in the case of a stand-alone terminal) and go to the particular address of the stored digital receipt presented thereto. As well, the POS terminal 20 may accept a keyed URL 98 via a keyboard or other input device associated with the POS terminal 20 to access the data warehouse 26 and to the particular address of the stored digital receipt presented thereto. It should be appreciated that the POS terminal 20 may also have a printer 94 associated therewith that may provide an address to a stored digital receipt in a format as described herein.

Operation

Figure 6:
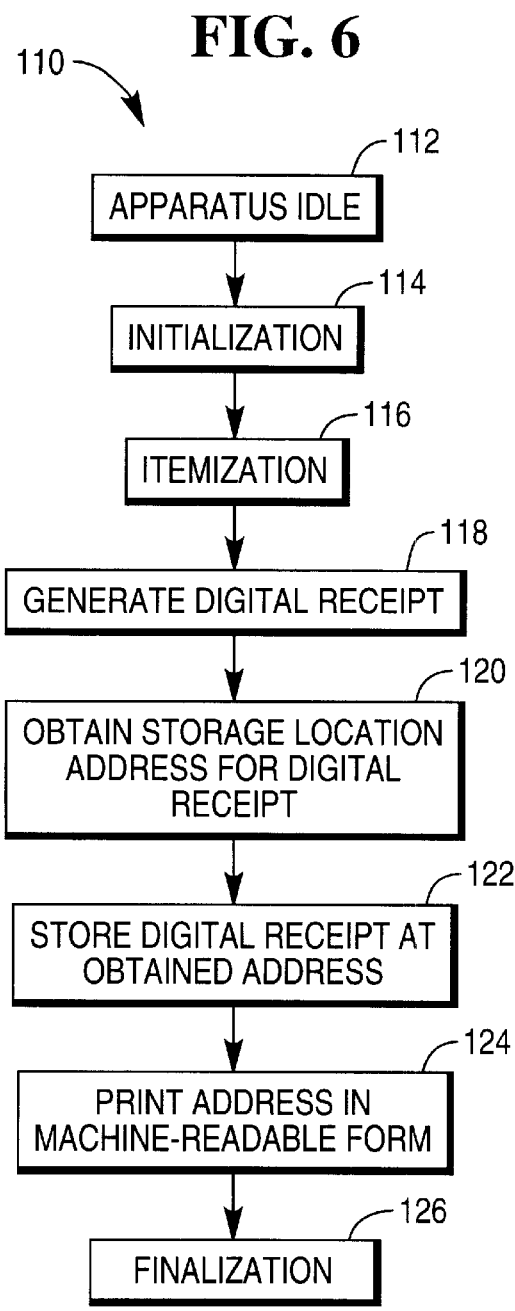
FIG. 6 is a flow chart depicting a manner in which a digital receipt to be stored and a paper receipt with a storage address for the digital receipt is obtained in accordance with the principles of the present invention.

Referring to FIG. 6, there is shown a flow chart, generally designated 110, illustrating a manner of operation of an aspect of the principles of the present invention. Initially, the retail terminal 19 is idle, block 112. When the retail terminal 19 detects a product/item, such as by the retail terminal 19 scanning an item, the retail terminal begins initialization, block 114. After initialization, the various items or products are scanned into the retail terminal 19, block 116, itemization.

After the scanner 42 has scanned all of the items, the retail terminal 19 generates a digital receipt 34, block 118. The retail terminal 19 then obtains a storage location address for the digital receipt, block 120. The storage location address is an address where the digital receipt will be stored in the data warehouse 26 (or any data storage medium) that is in communication with the retail terminal 19. As indicated above, the storage location address may be obtained from the data warehouse 26 or may be generated by the retail terminal 19.

The digital receipt is then stored in the data warehouse 26 at the obtained address, block 122. The printer 54 of the retail terminal 19 prints the obtained storage location address for the consumer in a machine-readable form, block 124, such as a bar code. The address may be printed onto a paper receipt 34 for the purchase transaction that has occurred on the retail terminal 19. Thereafter, the retail terminal 19 finalizes the purchase transaction, block 126.

It should be appreciated that the order of the particular blocks may be varied. For example, the digital receipt may be stored before the address is obtained. As well, other variations in the order and/or procedure may be used.

Figure 7:
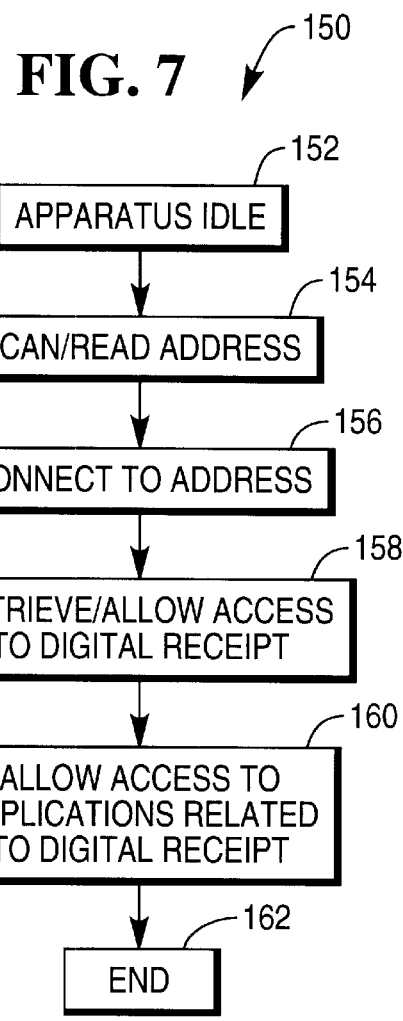
FIG. 7 is a flow chart depicting a manner in which the consumer may access the stored digital receipt and/or applications corresponding to the digital receipt utilizing the printed, machine-readable digital receipt storage location address in accordance with the principles of the present invention.

Referring to FIG. 7, there is shown a flow chart, generally designated 150, illustrating a manner of operation of another aspect of the present invention. Initially a retail terminal 19 is idle, block 152. A consumer provides the printed address in machine-readable form to the retail terminal, which scans or reads the address, block 154. The retail terminal 19 then connects to the address scanned or read within the data warehouse 26 via the network 24, block 156. The retail terminal then retrieves and/or allows access to the digital receipt for the consumer, block 158. The consumer may then peruse the digital receipt for accuracy. Additionally, the consumer is allowed access to various applications associated with or related to the digital receipt, block 160. This includes the ability to perform various functions within the specific application. Examples of such applications include a frequent shopper points program in which the consumer may view their points accumulation and awards, a purchased item verification program, a credit/return item verification program, and the like.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for allowing a party to a purchase transaction access to a stored digital receipt for the purchase transaction and a retail application relating to the purchase transaction comprising:
    a retail terminal in communication with an electronic network;
    a printer associated with said retail terminal and operative to print a network address in a machine readable form; and
    an addressable storage medium in communication with the electronic network, the addressable storage medium operative to store a digital receipt at a particular storage address corresponding to a particular storage location in said addressable storage medium, and having a plurality of user-operable retail applications relating to the purchase transaction;
    the retail terminal operative to:
        (i) produce a digital receipt corresponding to a purchase transaction;
        (ii) store the produced digital receipt in the addressable storage medium;
        (iii) obtain a storage address for the stored digital receipt; and
        (iv) print a network address consisting of the storage address of the digital receipt and an access address for the user-operable retail applications in the machine-readable form.

2. The system of claim 1, wherein said addressable storage medium comprises a data warehouse.

3. The system of claim 2, wherein the electronic network comprises the Internet.

4. The system of claim 1, wherein the machine-readable form comprises a bar code.

5. The system of claim 1, wherein said printer is operable to print the network address in the machine-readable form on a paper receipt corresponding to the purchase transaction.

6. A retail system comprising:
    a retail terminal;
    a printer in communication with said retail terminal; and
    a data warehouse in communication with said retail terminal, the data warehouse operative to store digital receipts received from said retail terminal, and having a plurality of user-operable retail applications pertaining to the stored digital receipts, the data warehouse further in communication with a network and accessible thereby via a remote terminal;
    the retail terminal operative to produce a digital receipt upon completion of a purchase transaction, provide the digital receipt to the data warehouse obtain a storage address for the provided digital receipt, and provide the storage address to the printer; and
    the printer operative to print, in machine-readable form, a network address consisting of the storage address and an access address for the plurality of user-operable retail applications, the network address providing a user access, over the network via the remote terminal operative to read the network address, the stored digital receipt in the addressable storage medium and the plurality of user-operable retail applications.

7. The retail system of claim 6, wherein the network comprises the Internet.

8. The retail system of claim 6, wherein the machine-readable form comprises a bar code.

9. The retail system of claim 6, wherein the printer is operative to print the network address in the machine-readable form on a paper receipt corresponding to the purchase transaction and the digital receipt.

10. The retail system of claim 6, wherein the plurality of user-operable retail applications comprises a purchase item verification application, a purchase item credit verification application, and a frequent shopping points verification application.

11. A retail method comprising:
    providing a retail terminal in communication with an electronic network;
    providing a printer associated with the retail terminal and operative to print a network address in a machine readable form;
    providing an addressable storage medium in communication with the electronic network, the addressable storage medium operative to store a digital receipt at a particular storage address corresponding to a particular storage location in said addressable storage medium, and having a plurality of user-operable retail applications relating to the purchase transaction;

producing a digital receipt corresponding to a purchase transaction;

storing the produced digital receipt in the addressable storage medium;

obtaining a storage address for the stored digital receipt; and printing a network address consisting of the storage address of the digital receipt and an access address for the user-operable retail applications in the machine-readable form.

12. The method of claim 11, wherein the network comprises the Internet.

13. The method of claim 11 wherein the machine-readable form comprises a bar code.

14. The method of claim 11, wherein the printer is operative to print the network address in the machine-readable form on a paper receipt corresponding to the purchase transaction and the digital receipt.

15. The method of claim 11, wherein the plurality of user-operable retail applications comprises a purchase item verification application, a purchase item credit verification application, and a frequent shopping points verification application.

* * * * *